Figure 1:
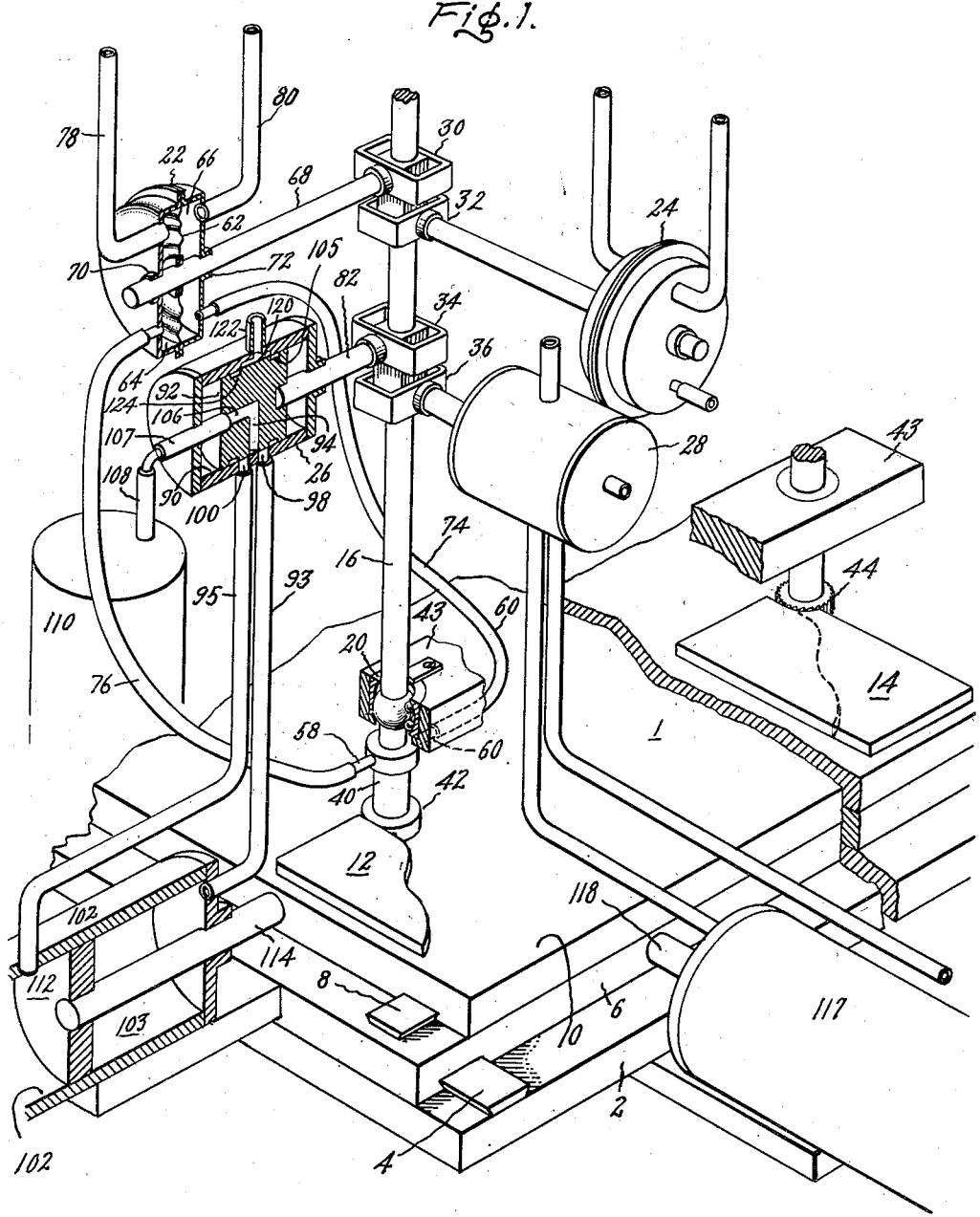

Oct. 23, 1956  A. BENTLEY  2,767,620
CONTROL FOR DUPLICATING MACHINES
Filed Dec. 30, 1953  2 Sheets-Sheet 2
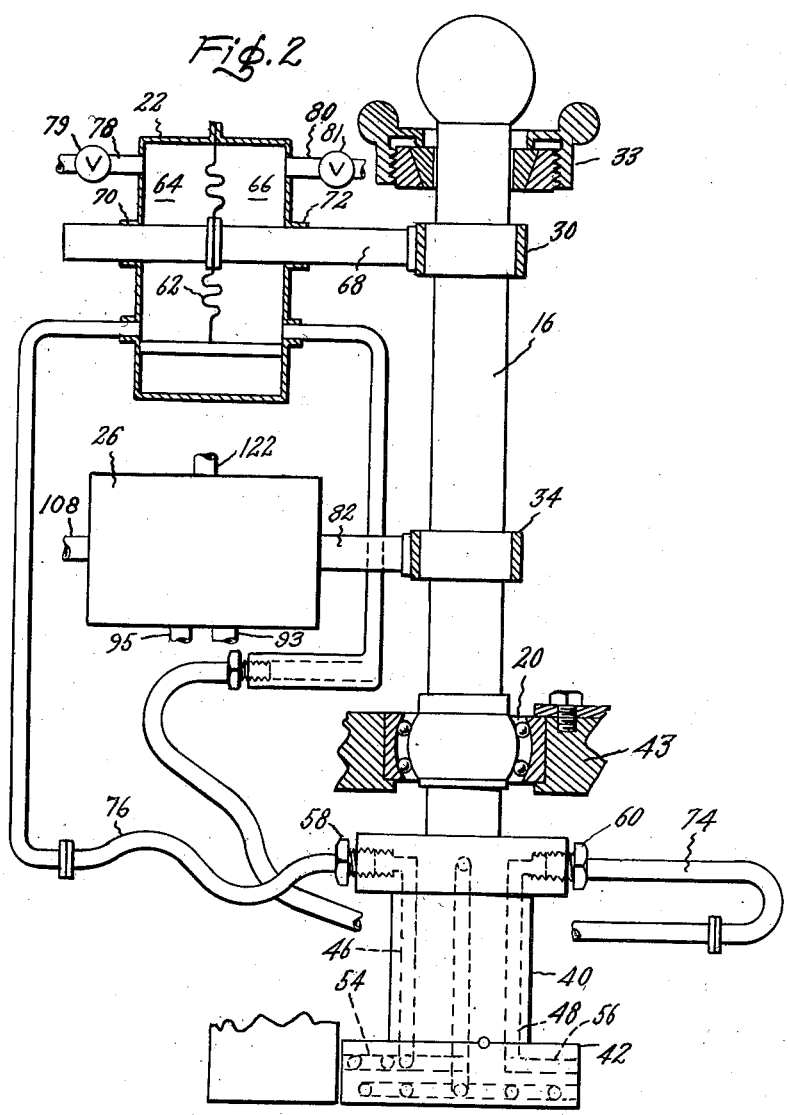
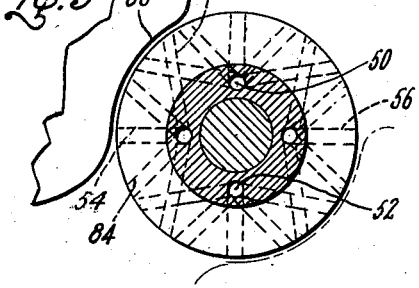
Inventor
Arthur P. Bentley
by [signature]
His Attorney

United States Patent Office 2,767,620
Patented Oct. 23, 1956

2,767,620

CONTROL FOR DUPLICATING MACHINES

Arthur Bentley, Greenfield Center, N. Y., assignor to Portland Machine Tool Works Inc.

Application December 30, 1953, Serial No. 401,219

1 Claim. (Cl. 90—13.5)

This invention relates to duplicating machines and more particularly to an automatic control for duplicating machines of the type wherein a cutter is employed to cut stock to match a pattern.

While this invention will be described with particularity in connection with a duplicating machine of the milling-cutter type, it should be understood that such an example is not intended as a limitation on the scope of the invention, but rather has it been selected merely to help define the invention and to point out particularly its theory of operation.

Any skilled workman is familiar with duplicating machines of a type wherein a pattern and a work piece are mounted in fixed relation to one another on a table that is movable simultaneously in two transverse directions in one plane. With this arrangement, the table permits the pattern to follow a stylus while the work moves against a rotary cutter, whereby the work piece is trimmed to match the pattern. In conventional installations of this type, servo mechanisms and electronic control devices are employed to effect automatic operation of the duplicating machine.

Unfortunately, in the prior art, the controls for automatic duplication have been either so cumbersome or so costly, as well as inaccurate, that an improved inexpensive control for an automatic duplicator is required. Accordingly, it is an object of this invention to provide such an improved control for an automatic duplicating machine.

It is a further object of this invention to provide an improved, durable, easily adjustable control for regulating the table movement of an automatic duplicating machine.

It is a still further object of this invention to provide an improved, yet simple and accurate, control for regulating a work table that is simultaneously movable in two transverse directions in one plane.

Further objects and advantages of this invention will become apparent and the invention will be better understood from the following description referring to the accompanying drawings, and the features of novelty which characterize this invention will be pointed out with particularity in the claims annexed to and forming a part of this specification.

Referring to the drawings, Fig. 1 is a perspective view, partly in section, of a work table and its improved automatic duplicating control;

Fig. 2 is a front elevation, partly in section, of the duplicating control employed for regulating movement in one plane; and Fig. 3 is a plan view of a portion of the invention shown with a pattern that is to be duplicated.

With reference to the drawings, and more particularly to Fig. 1, a work table 1 is shown movable in two transverse directions in the same plane. Specifically, a base 2 is shown provided with rails 4 which guide the movement in one direction of a base center portion 6. Center portion 6, in turn, is provided with rails 8 that guide the transverse movement of the work surface 10, which is thus movable simultaneously in two directions in the same plane.

A pattern 12 and a work piece 14 are shown fixedly positioned on the work surface 10, while a control rod 16 is shown held vertically with respect to the work surface. A stylus or pattern follower 42 is positioned on the bottom of control rod 16 for operative contact with the pattern 12.

The control rod 16 is shown supported for pivotal motion in two transverse planes by a fulcrum block 20, while a pair of selector bellows 22—24, respectively, and corresponding positioning valves 26—28, respectively, are shown positioned for movement with the upper end of the control rod.

Specifically, the selector bellows 22—24, respectively, are connected to the control rod 16 by means of universal joint-type bearings 30—32, while positioning valves 26—28, respectively, are shown connected to the control rod by means of universal joint-type bearings 34—36.

While it is not intended as a limitation, it is important to note that in a preferred embodiment, deflection of the control rod 16 with respect to the vertical is limited to about two-thousandths of an inch at the universal bearings 30—32. This limitation is regulated by the dimensions of collet 33.

With reference now to Fig. 2, the selector bellows 22 and positioning valve 26 are shown connected to the control rod 16, which is provided at its base with a collar 40 having a stylus 42 of the same mean diameter as a milling cutter 44 (shown in Fig. 1 adjacent the work piece 14). More important is the fact that in a preferred embodiment the stylus 42 and cutter 44 are rigidly fixed relative to one another through the medium of some suitable support member 43, and it is the movement of the table which causes the work piece to be moved against the cutting wheel to effect the duplication of the pattern.

Collar 40 (Fig. 3) is provided with diametrically opposite axially extending passageways 46—48 in one plane and 50—52 in a plane at right angles to the one including passageways 46—48.

The passageways 46—48, respectively, interconnect radially extending diametrically opposite passageways 54—56 lying in the stylus 42, with hose connections 58 and 60, respectively, located in the upper end of collar 40.

The selector bellows 22 has a diaphragm 62 that divides it into two chambers 64 and 66. A rod 68 connects the center of diaphragm 62 with universal bearing 30. Obviously, the rod must pass through suitable packing glands 70—72 in the outer walls of the selector bellows 22. With this construction, rod 68 is axially movable, in response to deflection of diaphragm 62, to move control rod 16.

Flexible tube 74 connects chamber 66 of selector bellows 22 with the hose connection 60 in collar 40, while a flexible tube 76 connects the chamber 64 with the hose connection 58.

With this structural arrangement, compressed air, which is supplied to the chambers 64 and 66, respectively, by the air supply hoses 78—80 as regulated by valves 79—81, respectively, is conducted through the tubes 76 and 74 to the collar 40 and then out the diametrically opposite radial passageways 54 and 56.

Assume that the table work surface 10 has been adjusted so that a portion of the pattern is immediately adjacent the radial passageway 54 of the stylus 42 (see Fig. 3). Assume further that the air pressure in chambers 64 and 66 has been adjusted so that, due to the end restriction on radial passageway 54 produced by pattern 12, the unbalanced pressure on diaphragm 62 pushes rod 68 and control rod 16 to the right just enough to hold the stylus 42 in contact with the pattern. With this pressure balance in the chambers 64—66, a steady-state condition will exist so long as the pattern is adjacent the stylus 42. If the pattern is backed away from the stylus 42, however, then the restriction at the mouth of passageway 54 has been removed, and consequently, much more air will escape from it to decrease the pressure in the chamber 64, whereupon the pressure in chamber 66 will push upon diaphragm 62 to pull the control rod counterclockwise about fulcrum 20 from the position shown in Fig. 2.

This counterclockwise movement of the control rod pushes on a rod 82, which connects with positioning valve 26 to the control rod 16 at universal bearing 34, and thereby upsets a fluid balance within the positioning valve which, in a manner hereinafter to be described, pushes the pattern back into engagement with the stylus, so as to restore the original pressure balance (steady-state condition) between the chambers 64 and 66.

It should be noted that if the pattern, instead of backing away from the stylus 42, starts to move closer to it, then passageway 54 will be even more restricted, and the pressure in chamber 64 will be increased. Accordingly, the diaphragm 62 will push on the rod 68 causing control 16 to be rotated clockwise (about fulcrum 20) from its position as shown in Fig. 2 and thereby to pull on the rod 82 of positioning valve 14, thus upsetting the balance within the positioning valve in the opposite direction. The work surface 10 will then be moved, in a manner hereinafter to be described, so as to pull the pattern slightly away from the stylus until the initial pressure balance (steady-state condition) is reinstated in the chambers 64 and 66.

A refinement of this operating principle, about to be described, is shown in Fig. 3; that is, radial passageway 54 is one of a plurality of fanned-out finger-like passageways, as are passageways 84 and 86. Accordingly, if the pattern (Fig. 3) is being moved relative to the stylus so that a curved portion 88 is about to contact the stylus, then the escape of air through passageway 86 will be restricted and the pressure in chamber 64 will be built up sufficiently to start the table work surface 10 (Fig. 3) moving to the left to permit more air to escape until the preset steady-state condition between chambers 64 and 66 has been re-established.

With reference to the particular structure used to cause the work table to move in response to pressure unbalanced in the compartments 64—66, it has been pointed out heretofore that movement of control rod 16 as called for by bellows 62 produced an axial movement of connecting rod 82 extending from positioning valve 26. Assume shaft 82 is moved axially to the left (Fig. 2), which movement takes place as the pattern falls away from the stylus 42, so as to remove the restriction from the end of passageway 54 and thereby permit the air in chamber 66 to deflect diaphragm 62 to the left—then this movement of rod 82 should cause the positioning valve to effect a movement of the work surface 10 so that the pattern 12 is brought up against the stylus 42 to re-establish the (steady-state) pressure balance between chambers 64 and 66. In order to accomplish this result, the following structure is utilized: The positioning valve (Fig. 1) comprises a typical cylinder 90 closed at both ends and housing an axially slidable piston 92, which is connected by means of rod 82 and universal joint 34 to the control rod 16. Flexible tubes 93 and 95 connect ports 98 and 100, respectively, to opposite ends of a power cylinder 102 (hereinafter described). Piston 92 has a central radial bore or port 94 and an interconnecting central axial bore 106, which is connected by means of hollow rod 107 and flexible hose 108 to a constant pressure source of hydraulic liquid 110. The mouth of the radial port 94 normally—that is when selector bellows 22 is in steady-state position—lies immediately between the ports 98 and 100. Further, the diameter of the bore 94 is exactly equal to the distance between the ports 98 and 100. The dimensions and locations of bore 94 and ports 98—100 must be maintained within close tolerances, so that any slight movement (even .001") of the rod 82 will cause the bore 94 to come into alignment with a part of one of the ports 98 or 100, thereby causing hydraulic fluid to spill from the constant pressure source 110 through flexible hose 108, rod 107, bore 106 and radial bore 94 to port 98 or 100, and then through the respective flexible hoses 93 or 95 to the associated end of power cylinder 102. Accordingly, if the rod 82 is moved to the left as viewed in Fig. 2 (pattern separated from stylus), the radial bore 94 will open onto port 100, thereby causing the hydraulic fluid to spill through the flexible hose 95 and into power cylinder 102 to drive piston 112 to the right. This will push work surface 10 by means of rod 114 and, therefore, pattern 12 back into engagement with the stylus 42. Specifically, power cylinder 102 is supported on the intermediate surface 6 of work table 1, and as the intermediate surface 6 moves on rails 4, the power cylinder 102 moves with it. Consequently, the movement of work surface 10 as caused by piston 112 through the rod 114 is limited to movement back and forth along rails 8.

Movement in a transverse direction is controlled by a second power cylinder 117 which is supported from base 2 and pushes, by means of piston (not shown) and rod 118, on the intermediate surface 6 to move it back and forth along rails 4 at right angles to the movement produced by rod 114. The movement of the second power cylinder 117 and its connecting rod 118 is controlled by the operation of selector bellows 24, positioning valve 28, and the associated tubing (not shown) similar to that described for use with bellows 22 and positioning valve 26.

Referring again to the movement of the piston 92 of positioning valve 26, as the radial passageway or port 94 is brought into alignment with the port 100 to permit the high pressure fluid to flow through flexible tube 95 and through a port 97 into power cylinder 102, the hydraulic fluid in chamber 103 of cylinder 102 is freed through port 99 and carried by tube 93 to port 98. The fluid entering positioning valve 26 at port 98 is carried by a circumferential groove 105 cut in piston 92 to a port 120, which is connected by means of tube 122 back to the sump of the high pressure source 110. It should be pointed out that piston 92 has a second circumferential groove 124 which overlies the port 100 when the radial passageway 94 is in selective engagement with the port 98. Accordingly, irrespective of whether fluid is being forced by the movement of piston 112 through tubes 93 or 95, the fluid escapes through the respective circumferential groove 105 or 124 and tube 122 back to the sump of the hydraulic pressure source 110.

By maintaining the pressure in constant pressure source 110 at a sufficiently high level, then any slight movement of the piston 92 that causes radial passageway 94 to move into alignment with either ports 98 or 100, will cause an immediate movement of power piston 112 so as to move the work surface, and hence the pattern, with respect to stylus 42 to restore the steady-state condition in the selector bellows 22.

While the foregoing description is related to movement of the control rod in only one plane, it is obvious that with the provision of the second set of controls (selector bellows 24 and positioning valve 28) the control rod 116 simultaneously can be moved in a plane at right angles to that movement described with respect to Fig. 2. Accordingly, the work surface 10 can be moved simultaneously in two directions transverse to each other in one plane.

Further, it should be pointed out that by controlling the fluid flow from the constant pressure source 110, the rate of feed of the work into the cutter 44 can be controlled; that is, the cutting rate will be directly proportional to the rate of fluid flow from constant pressure source 110. Therefore, depending upon the type of material to be cut, the rate of flow from the constant pressure source 110 can be regulated in accordance with good machining policy.

Modifications of this invention will occur to those skilled in the art, and it is desired to be understood, therefore, that this invention is not to be limited to the particular arrangement disclosed, but that the appended claims are meant to cover all modifications which do not depart from the spirit and scope of the invention.

What I claim as new and desire to secure by Letters Patent of the United States is:

In combination with a duplicating machine wherein a pattern and a work piece are fixedly positioned on a work surface member and wherein a pattern follower and a cutting tool are fixedly positioned relative to one another in a support member and wherein said pattern follower is adapted to follow said pattern to effect the controlled trimming of the work piece by said cutting tool; an improved control for automatically regulating the movement of one of said members to effect the duplication of said pattern by said cutting tool, said control comprising means for directing a blast of air out of said pattern follower to impinge upon a proximate pattern whereby the relative closeness between said pattern and follower acts as an air flow regulator, hydraulic means for moving one of said members to regulate the relative distance between said pattern and follower, said air blast means comprising a radially directed passageway defined by said pattern follower, a selector bellows defining a pair of air compartments separated by a flexible diaphragm, each of said compartments having respectively an air inlet and an air outlet passageway, adjustable means in each of said inlet passageways for regulating a steady-state air flow condition, tube means connecting one of said compartment outlets to said pattern follower passageway, a valve and valve conditioning means responsive to a change in the air pressure in said pattern follower as brought about by a change in the relative positions between said pattern and follower for effecting the operation of said hydraulic means, said valve comprising a cylinder having a pair of axially displaced ports, a piston axially movable in said cylinder, and a fluid passageway in said piston adapted to communicate with either of said valve ports thereby to regulate a flow of fluid to said hydraulic means, said valve conditioning means comprising a control rod pivotally mounted on said support member, positive means interconnecting said diaphragm and said control rod to pivot the latter in response to deflection of said diaphragm, and means interconnecting said valve piston and said control rod for axial displacement of said piston in response to deflection of said control rod.

References Cited in the file of this patent

UNITED STATES PATENTS

| | | |
|---|---|---|
| 2,072,336 | Johansen | Mar. 2, 1937 |
| 2,380,357 | Ziebolz | July 10, 1945 |
| 2,434,853 | Johnson | Jan. 20, 1948 |